(12) United States Patent
Eriksson et al.

(10) Patent No.: US 8,843,633 B2
(45) Date of Patent: Sep. 23, 2014

(54) CLOUD-BASED RESOURCE IDENTIFICATION AND ALLOCATION

(75) Inventors: Johan Eriksson, Orebro (SE); Jonathan Whitney, Cambridge, MA (US)

(73) Assignee: BMC Software, Inc., Houston, TX (US)

( * ) Notice: Subject to any disclaimer, the term of this patent is extended or adjusted under 35 U.S.C. 154(b) by 290 days.

(21) Appl. No.: 13/070,412

(22) Filed: Mar. 23, 2011

(65) Prior Publication Data
US 2012/0246317 A1    Sep. 27, 2012

(51) Int. Cl.
*H04L 12/56* (2006.01)
*G06F 9/50* (2006.01)

(52) U.S. Cl.
CPC .................................... *G06F 9/5072* (2013.01)
USPC ........................................................ 709/226

(58) Field of Classification Search
None
See application file for complete search history.

(56) References Cited

U.S. PATENT DOCUMENTS

| | | | | |
|---|---|---|---|---|
| 6,950,874 | B2* | 9/2005 | Chang et al. | 709/229 |
| 6,986,137 | B1* | 1/2006 | King et al. | 718/104 |
| 7,266,823 | B2* | 9/2007 | Alford, Jr. | 718/104 |
| 7,725,559 | B2* | 5/2010 | Landis et al. | 709/215 |
| 8,396,989 | B2* | 3/2013 | Chaturvedi et al. | 709/244 |
| 8,516,495 | B2* | 8/2013 | Biran et al. | 718/106 |
| 2009/0241108 | A1* | 9/2009 | Edwards et al. | 718/1 |
| 2010/0175107 | A1* | 7/2010 | Sugarbroad | 726/3 |
| 2011/0185064 | A1* | 7/2011 | Head et al. | 709/226 |
| 2011/0320606 | A1* | 12/2011 | Madduri et al. | 709/226 |
| 2012/0047265 | A1* | 2/2012 | Agarwala et al. | 709/226 |
| 2012/0054626 | A1* | 3/2012 | Odenheimer | 715/738 |
| 2012/0102199 | A1* | 4/2012 | Hopmann et al. | 709/226 |
| 2012/0182993 | A1* | 7/2012 | Hadas et al. | 370/392 |

OTHER PUBLICATIONS

Allen B. Downey, The Little Book of Semaphores, 2008, Version 2.1.5.*
VPN 3000 Series Concentrator Reference vol. I: Configuration. Chapter 12: "Load Balancing Cisco VPN Clients." pp. 1-6, Mar. 25, 2010.
"Cisco Secure Network Container" Multi-Tenant Cloud Computing. White paper. Cisco Systems, Inc. San Jose, CA. 2010. pp. 1-6.
"Cisco Virtualized Multi-Tenant Data Center, Version 2.0 Compact Pod Design Guide." Cisco Systems, Inc. San Jose, CA. 2010. pp. 1-94.
Ginis, Roman. "Optimal Distributed Resource Allocation." California Institute of Technology. Pasadena, CA. Jun. 11, 1999. pp. 1-42.

* cited by examiner

*Primary Examiner* — Robert C Scheibel
*Assistant Examiner* — Omeed D Rahgozar

(57) ABSTRACT

Systems, methods, and computer readable media for identifying resources to implement a service in a cloud computing environment are disclosed. In general, the disclosed methodologies analyze a cloud's ability to support a desired service while maintaining separation between the cloud's logical layers. For example, given a list of resources needed to implement a target service, a hierarchical plan may be generated. The plan may then be used by each layer to track and record the availability of various possible layer-specific resource selections. Since each layer may be permitted access only to that portion of the plan that is associated with, or applicable to, the specific layer, the logical separation between different layers may be enforced. As a consequence, each layer may implement its resource selection mechanisms in any desired manner.

13 Claims, 7 Drawing Sheets

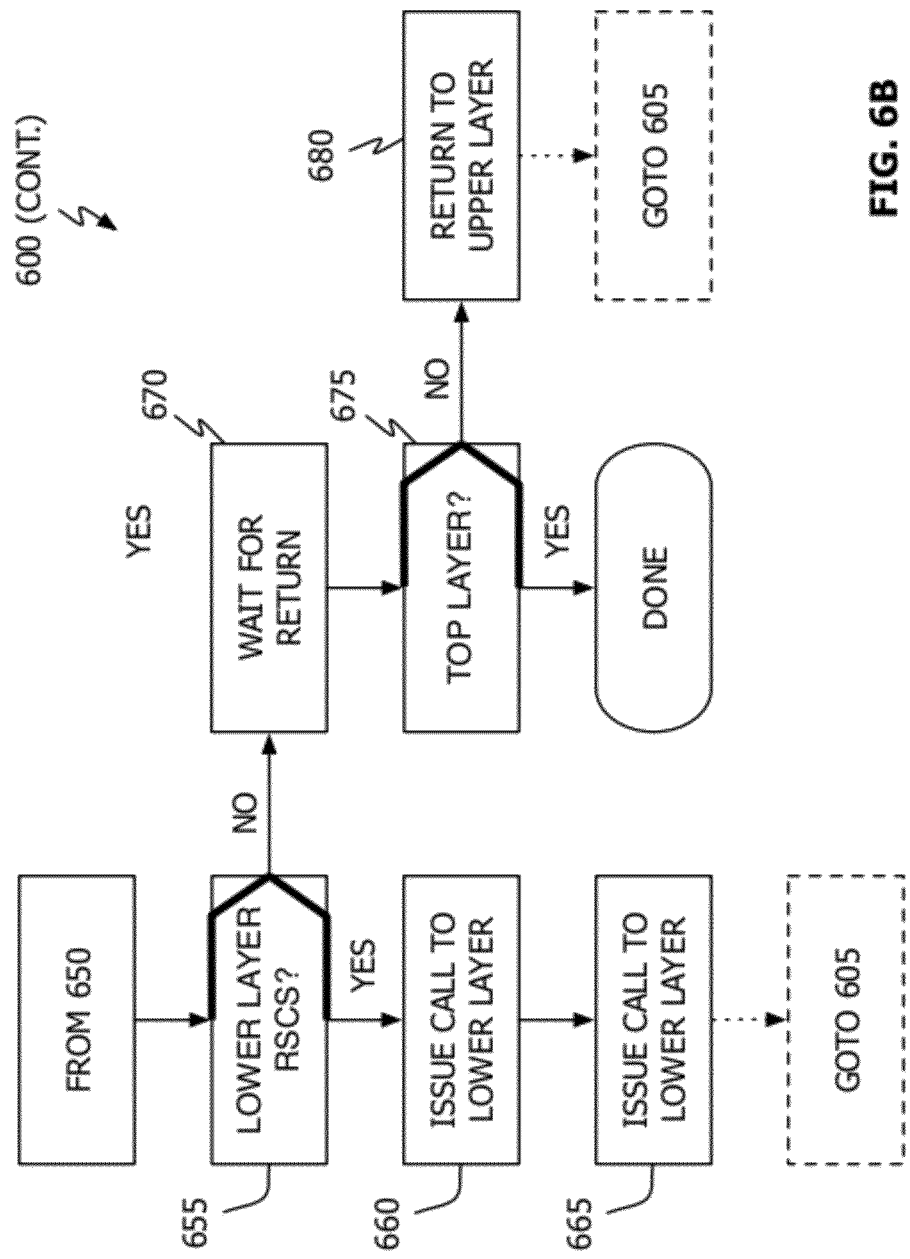

CLOUD-BASED RESOURCE IDENTIFICATION AND ALLOCATION

BACKGROUND

This disclosure relates generally to the field of computer network management. More particularly, but not by way of limitation, it relates to techniques for identifying and allocating resources to provision a specified service in a cloud computing environment.

The North American National Institute for Standard and Technology (NIST) describes cloud computing as a model for enabling on-demand network access to a shared pool of configurable computing resources (e.g., networks, servers, storage, applications, and services) that can be rapidly provisioned with minimal management effort or service provider interaction. In many modern environments the implementation of a cloud may be conceptually divided into layers— where each layer can "talk" with only those layers directly above and below it (typically through Application Programming Interfaces or APIs). For example, The NIST describes three basic cloud model layers Software as a Service (SaaS), Platform as a Service (PaaS) and Infrastructure as a Service (IaaS). in one cloud environment the user may interact with a workload manager (at the SaaS layer) in which services are defined (e.g., a shopping cart web application). Conceptually below this may be a PaaS layer in which a given resource (e.g., a compute cluster) is defined which, in truth, may be comprised of one or more elements from the IaaS layer (e.g., compute platforms or blades).

When provisioning a new cloud-based service, a user typically provides a set of resource requirements. The task is then to determine if the necessary resources are available and, if so, to allocate them so that the service may be provided. In the past, one of three approaches are adopted for this task: brute force; merging of architectural layers; and finding an optimal solution. In the brute-force approach, an assumption is made that the necessary resources are available. Under this assumption, each needed resource is identified and allocated in turn. A drawback to this approach is that if 'N' resources of a specified type are needed, but only (N-1) of those resources are actually available, the process fails on the attempted allocation of the Nth resource. At that time, all prior allocations must be undone. For complex services, this approach can be very time consumptive and, in addition, inefficient in its use of typing up resources that ultimately cannot be used. In an approach that merges the architectural layers of a cloud, a single layer gains visibility to all aspects of a service's topology. While this can work, and work efficiently, it results in an architecture that is rigid and inflexible. No architectural layer implementation may be changed without affecting all other layers. In an optimal solution approach, a function may be generated based on the required resources whereafter all suitable resources are identified through an investigation of each layer to identify all possible solutions to satisfy the target service request (i.e., the function). Once identified, all possible solutions are evaluated against a measurement metric and the "best" solution is chosen. A drawback to this approach is that it can be very time consumptive. For large systems (i.e., services requiring a number of different resources, some of which may be defined in terms of collections of other resources), the optimal solution may take an infinitely long time to identify.

Thus, it would be beneficial to provide a mechanism to identify those resources needed to satisfy a service request that is cost effective in terms of both time and resource use.

SUMMARY

In one embodiment the invention provides a method to identify resources required to support an application. The method includes receiving a plan indicating all of the resources required to support the service and, further, having sections corresponding to different architectural layers in the computing system (e.g., first and second layers) within which the service is to be provided; identifying one or more eligible resources of a type needed to support the application from all the resources indicated by the plan; selecting a particular resource instance from the eligible resources; updating the plan to indicate the particular resource instance was selected; and calling a lower architectural layer to supply the selected particular resource instance. (In general, each architectural layer communicates only with those layers immediately above and below itself.)

In another embodiment, if a particular architectural layer needs multiple instances of a particular type of resource from its lower layer, it may make a separate call to that layer for each needed instance (e.g., in parallel). In this way, methods to identify selected resources may be made in parallel. In accord with this approach, if a lower architectural layer indicates a first instance of a particular type is not available, its immediately higher layer may select another eligible instance of the resource (if one is available) and issue another call to its lower layer. Once all of the resources needed to support a desired application, the identified resources may be allocated (without fear of the process failing) and provisioned to supply the service. Illustrative web-based applications that may be deployed using the disclosed technology include a shopping cart and a wiki application (e.g., embodied in a two-tier architecture that includes a database and some PHP code that runs in Apache).

In still other embodiments, the disclosed methods may be implemented in one or more program modules and stored on a tangible (i.e., non-transitory) storage medium. In yet another embodiment, computer systems may be interconnected to provide the described functionality.

BRIEF DESCRIPTION OF THE DRAWINGS

FIGS. 6A and 6B show, in flowchart form, a resource identification operation in accordance with one embodiment.

DETAILED DESCRIPTION

This disclosure pertains to systems, methods, and computer readable media for identifying resources to implement a service in a cloud computing environment. (As used herein, the term resource may be physical or virtual.) In general, techniques are disclosed herein for analyzing a cloud's ability to support a desired service while maintaining separation between the cloud's logical (or architectural) layers. In one embodiment, given a list of resources needed to implement a target service, a hierarchical plan may be generated. The plan may then be used by each layer to track and record the availability of various possible layer-specific resource selections. Once all of the necessary resources are identified, they may be safely and quickly allocated and provisioned to implement the service. In another embodiment, each layer may be permitted access only to that portion of the plan that is associated with, or applicable to, the specific layer. Because the logical separation between different layers is enforced, each layer may implement its resource selection mechanisms in any desired manner without interfering with the operation of other layers within the system.

In the following description, for purposes of explanation, numerous specific details are set forth in order to provide a thorough understanding of the inventive concept. As part of the this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the network management and resource allocation field having the benefit of this disclosure.

Figure 1:
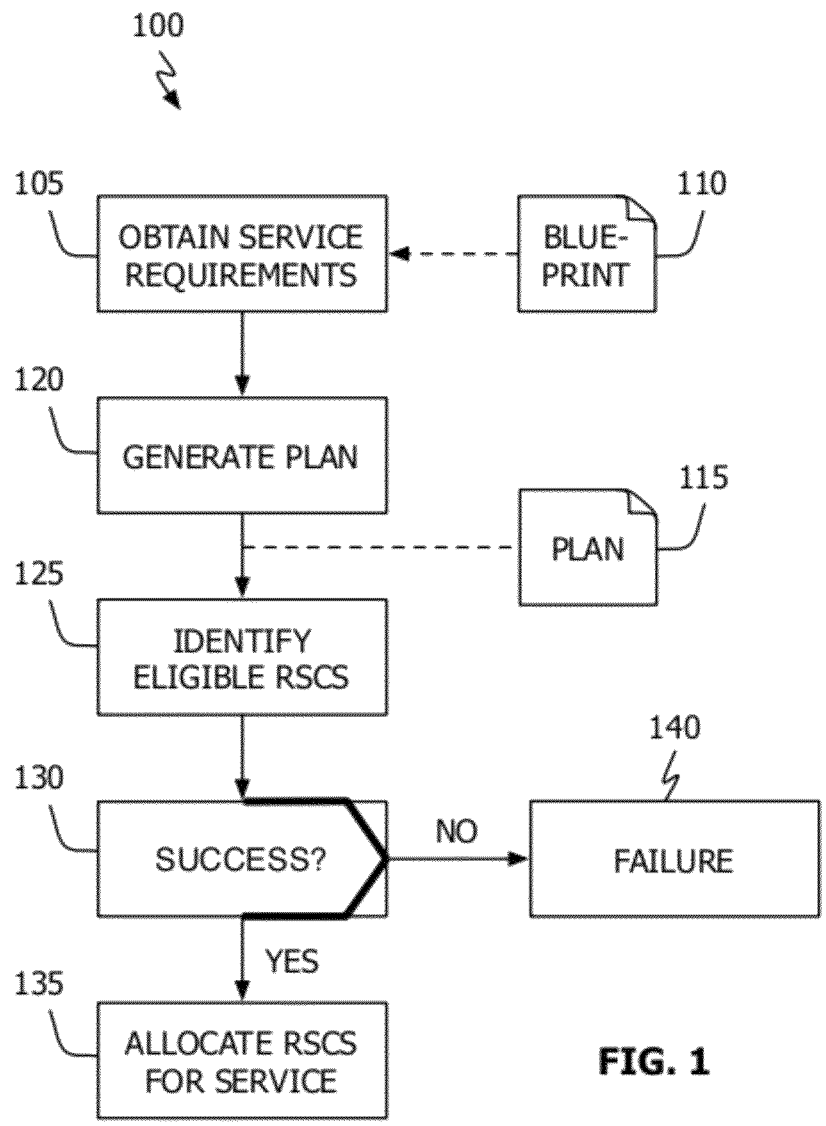
FIG. 1 shows, in flowchart form, a general approach to resource allocation in accordance with one embodiment.

Referring to FIG. 1, resource allocation operation 100 in accordance with one embodiment is shown in flowchart form. To begin, the resources required to support a target service are specified (block 105). In one embodiment the required resources may be specified through blueprint 110. Application blueprint 110 may be thought of as a complete definition for a given application (e.g., a web-based shopping cart application). Blueprint 110 describes the application's requirements in a logical fashion and may even define or specify an application's topology. Blueprint 110 may also include a deployment model aspect that defines how blueprint 110's logical elements may be mapped to a particular data center environment and for a particular deployment intent. Additional details concerning blueprints and deployment models may be found in the commonly owned and co-pending U.S. patent application entitled "Application Blueprint and Deployment Model for Dynamic Business Service Management (BSM)," Ser. No. 12/847,949, which is hereby incorporated in its entirety.

Plan 115 may then be generated (block 120) as resources eligible to support the service are identified (block 125). In some embodiments, plan 115 may be implemented as a tree-like object that is at least partially accessible from each of the different layers. In general, plan 115 may record the details of what has been allocated for each required resource in the blueprint's deployment model and may further be annotated with details of how/where that resource was allocated. More specifically, in one embodiment each node in plan 115 includes: the type of resource required; the resource instances available (after taking into account any system or user specified rules/policies) and, for each instance, an indication of whether that instance was evaluated for eligibility and failed (i.e., determined not to be available for a target application); the currently selected resource; and related resources that are related to the currently selected resource.

As suggested in FIG. 1, acts in accordance with block 125 start at a first, top-most layer, and iteratively or recursively pass to lower layers resource requests. (See discussion below with respect to FIG. 3.) If the necessary resources are identified and available (the "YES" prong of block 130), they may be allocated to instantiate the desired service (block 135). If, on the other hand, the required resources either do not exist or are not available (the "NO" prong of block 130), service instantiation fails (block 140). In this latter case, a message may be sent (in any fashion) to the individual requesting the service and/or logged.

Figure 2:
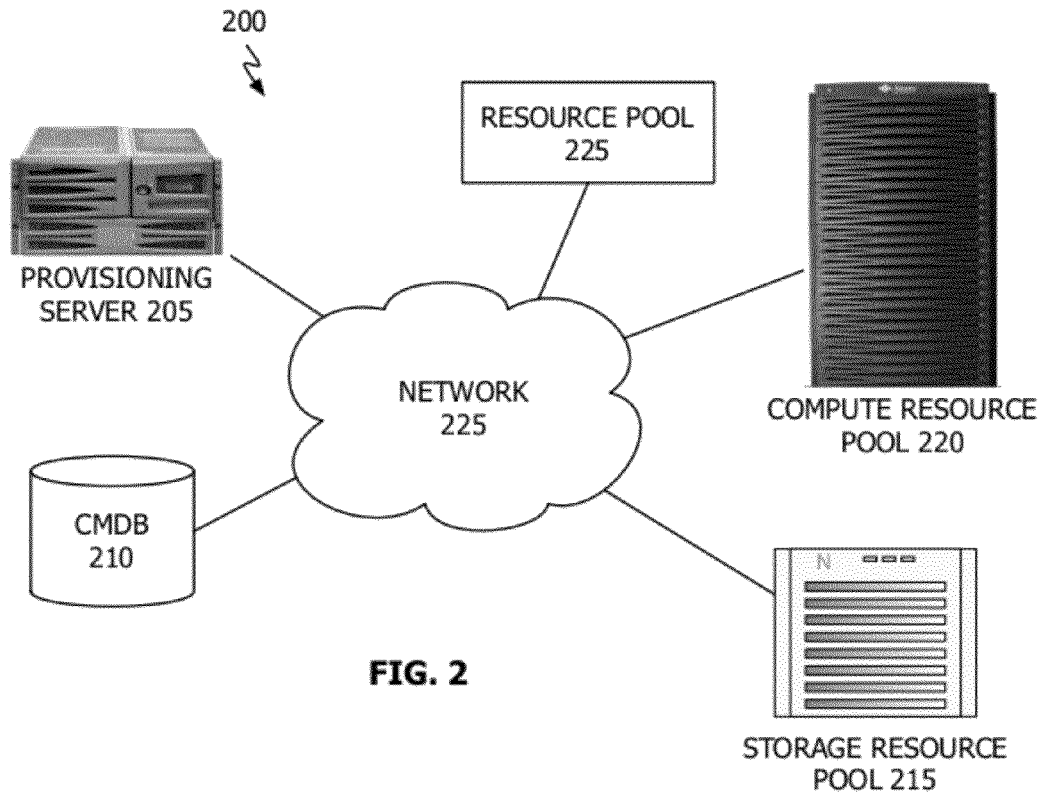
FIG. 2 shows, in block diagram form, a cloud-based environment in accordance with one embodiment.

By way of providing context for the following discussion, consider FIG. 2 in which cloud environment 200 includes provisioning server 205, configuration management database (CMDB) repository 210, storage resource pool 215, compute resource pool 220, and a pool of "other" resources 225 coupled through network 225. It will be recognized that multiple physical resources may be used to implement the illustrated logical functions. In like fashion, multiple logical functions may be implemented using a single physical resource. More specifically, provisioning server 205 may be one or more physical devices. Similarly, storage resource pool 215 and compute resource pool 220 may include any number of physical and/or logical storage devices and processing elements respectively. Resource pool 225 represents an aggregation of all other types of resources used by cloud environment 200 (e.g., routers, switches, firewalls, printers, personal computer systems such as desktop, notebook and tablet computer systems, and mobile devices). Further, network 225 represents a method of communicatively coupling devices and may include wide area networks (WANs), local area networks (LANs), intranets, or the Internet, any combination of these technologies and either wired or wireless network communication capabilities.

Figure 3:
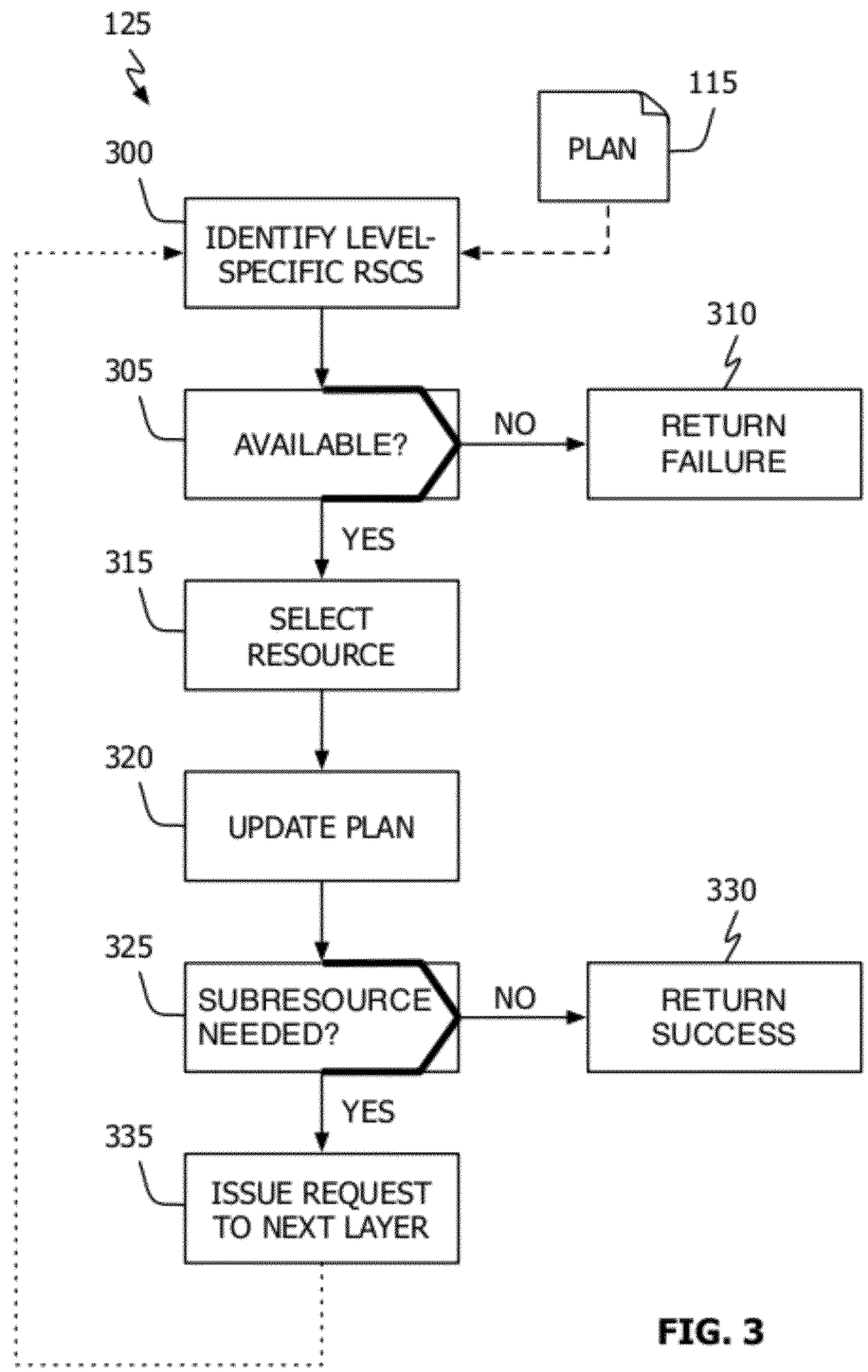
FIG. 3 shows, in flowchart form, a recursive resource allocation mechanism in accordance with one embodiment.

Referring now to FIG. 3, resource identification operation 125 in accordance with one embodiment uses plan 115 to identify one or more level-specific resources needed to satisfy the plan (block 300). If the required resource is not available (the "NO" prong of block 305), operation 125 returns failure for the current layer (block 310). (See discussion below.) If one or more needed resources are available (the "YES" prong of block 305), one resource instance is selected from the identified eligible resources (block 315) and plan 115 is updated to reflect the selection (block 320). A further check may be made to determine if the selected resource is itself comprised of one or more resources from a lower level (block 325). If the selected resource needs no additional resources (the "NO" prong of block 325), resource identification operation 125 returns success for the current layer (block 330). If the selected resource needs at least one resource from a lower layer (the "YES" prong of block 325), an indication of the needed resource and at least a part of plan 115 are used to issue a request for the resource to the next lower layer (block 335)—such action causing a (logically) recursive call to block 300.

With respect to acts in accordance with block 300, the identification of one or more resources may be made using any desired user or system specified constraints (e.g., policies). For example, plan 115 may simply require a relational database. System policy may, however, prioritize the selection of relational databases such that Oracle® databases are selected first if available, followed by a MySQL® database if available, followed by a Microsoft Access® database if neither of the first two are available. (ORACLE is a registered trademark of the Oracle International Corporation. MYSQL is a registered trademark of MySQL AB, a Swedish company. MICROSOFT ACCESS is a registered trademark of the Microsoft Corporation.)

With respect to acts in accordance with block 315, selection of one resource instance from multiple available resource instances may be made using any desired user or system specified constraints (e.g., policies). For example, selection criteria may be made to maximize performance, equalize load, minimize cost, etc.

Figure 4:
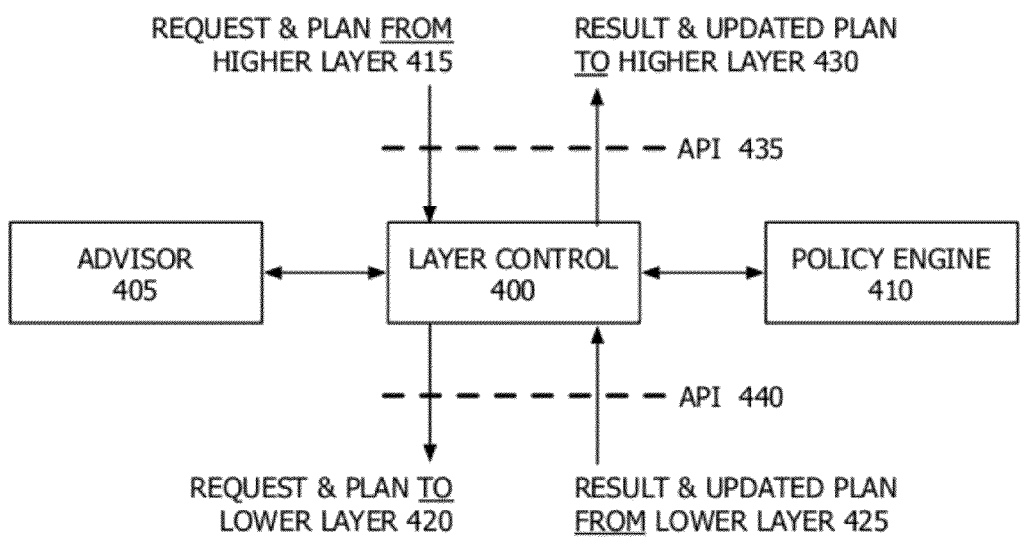
FIG. 4 shows, in block diagram form, the functional composition of a layer in accordance with one embodiment.

Referring to FIG. 4, in one embodiment each layer may be implemented in terms of three functional elements, components or modules: Layer Control module 400; Advisor module 405; and Policy Engine 410. As illustrated, Layer Control module 400 receives resource requests from higher layers 415, issues resource requests to lower layers 420, receives results in response to those requests from lower layers 425 and passes results to higher layers 430 (all through, for example, layer APIs 435 and 440). In addition, Layer Control module 400 may use Advisor module 405 to select one resource instance from a set or collection of available resource instances and may further be guided in its selection by Policy Engine module 410. In one embodiment, only that part of the plan (e.g., plan 115) applicable to the receiving layer is accessible to that layer. For example, in a plan organized as a tree structure, if layer-A deals with resources at level-A, that is the only part of the entire plan that it may access. In this manner, separation may be maintained between layers. In another embodiment, Layer Control module 400 may incorporate the functions of either, or both, Advisor module 405 and Policy Engine module 410. One benefit of maintaining the functional separation suggested by FIG. 4 is that each function may then be updated without impacting the operation of the other functions.

Graphic Example

Figure 5:
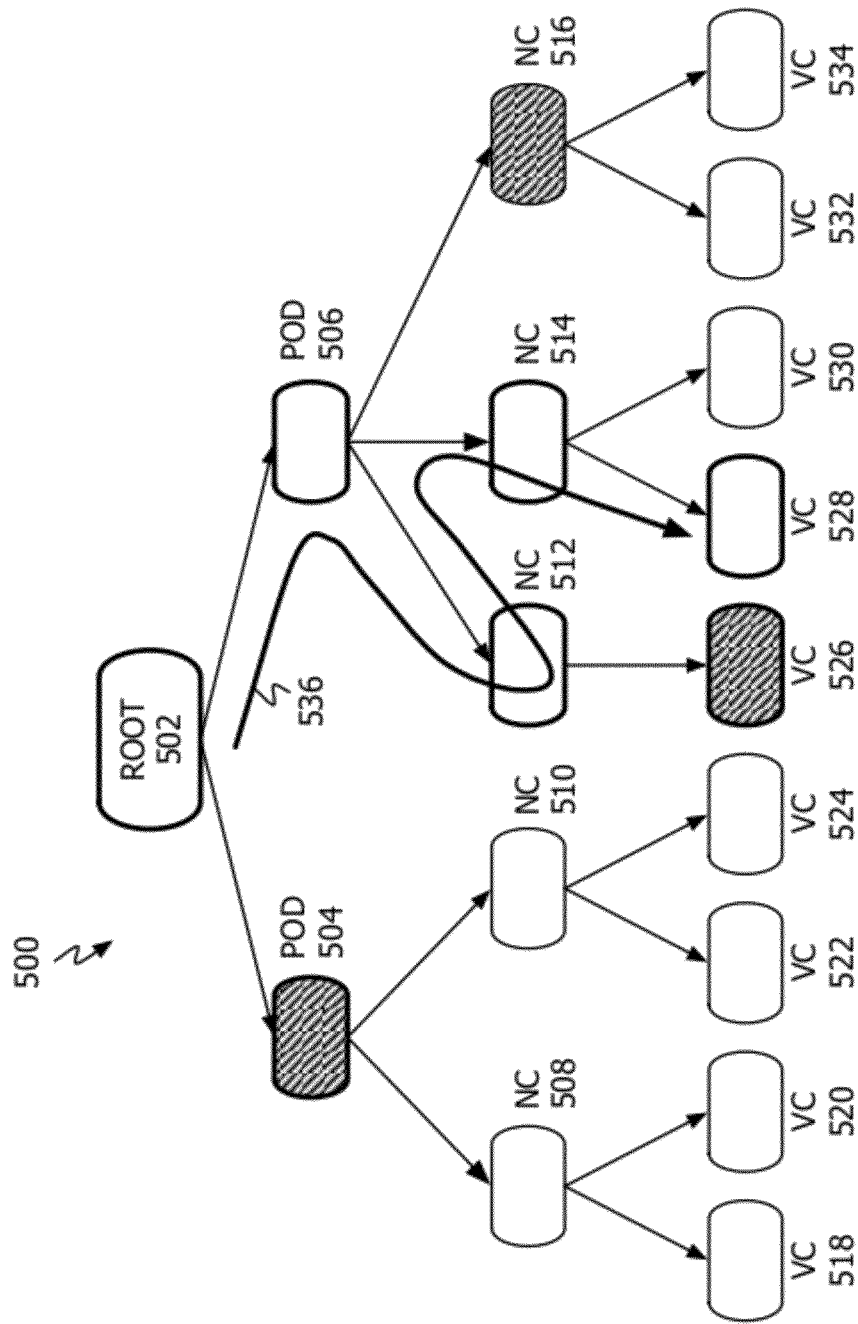
FIG. 5 shows a system architecture and selection path (through the system) of a provisioning operation in accordance with one embodiment.

Referring to FIG. 5, illustrative system 500 illustrates a four-layer cloud architecture which includes root node 502 (layer 1), two pod resources 504 and 506 (layer 2), five network container resources 508-516 (layer 3) and nine virtual cluster resources 518-534 (layer 4). As used here, the term "pod" refers to a modular unit of data center components. Pods provide a predictable set of resource characteristics (e.g., network, compute, and storage resource pools, power, and space consumption) that may be added repeatedly as needed; the phrase "network container" is an abstraction that permits network administrators to configure physical and virtual network infrastructure and network services through templates; and the phrase "virtual cluster" refers to a collection of resources that appear to outside clients as a single virtual cluster IP address, where this address is not tied to a specific physical device.

The goal in this example (e.g., as specified in a blueprint) is to identify those resources needed by a target application: 1 pod, 1 network container, and 1 virtual cluster. Track 536 illustrates a selection path through system 500 that could be taken by a resource identification operation in accordance with one embodiment (e.g., operation 125). Initially pod 504 was determined not to be eligible, as indicated by diagonal hashing (e.g., through the evaluation of policies by a layer control module and, possibly, the use of an Advisor module and Policy Engine as depicted in FIG. 4). As a consequence, the provisioning operation evaluated pod 506 finding it eligible. Subsequent evaluation determined that both network containers 512 and 514 were eligible while network container 516 was not. Selection path 536 indicates that network container 512 was (arbitrarily) chosen first for further evaluation, but when it was determined that its only virtual cluster 526 was not eligible, the provisioning operation backtracked to the pod layer. There it found network container 514 and virtual cluster 528 eligible. Having identified as eligible the target application's required resources the resource identification operation is complete. One of ordinary skill in the art will recognize that while a depth-first search of system 500 was adopted here, that is not necessary—any path through a system's architecture may be adopted. Also, while the use of policies was noted only in connection with the evaluation of pod eligibility, the same process may be used to make all eligibility determinations. In one embodiment each layer may employ its own layer control module (e.g., Layer Control module 400) and either an advisor module (e.g., Advisor module 405) and/or a policy engine (e.g., Policy Engine 410).

Algorithm Example

Problem Set-Up

To identify the resources needed to support a target application, a resource identification operation (e.g., operation 125) takes as input, the type of resource to allocate (call this type 'X'), the parent resource to draw from such as a network container, compute pool or virtual cluster (call this instance 'P'), and a plan object. Assume that a target service's blueprint requires three (3) instances of type 'Y' resource and that these should be drawn from type 'X' resources.

Algorithm Example

Successful Resource Identification

Figure 6A:
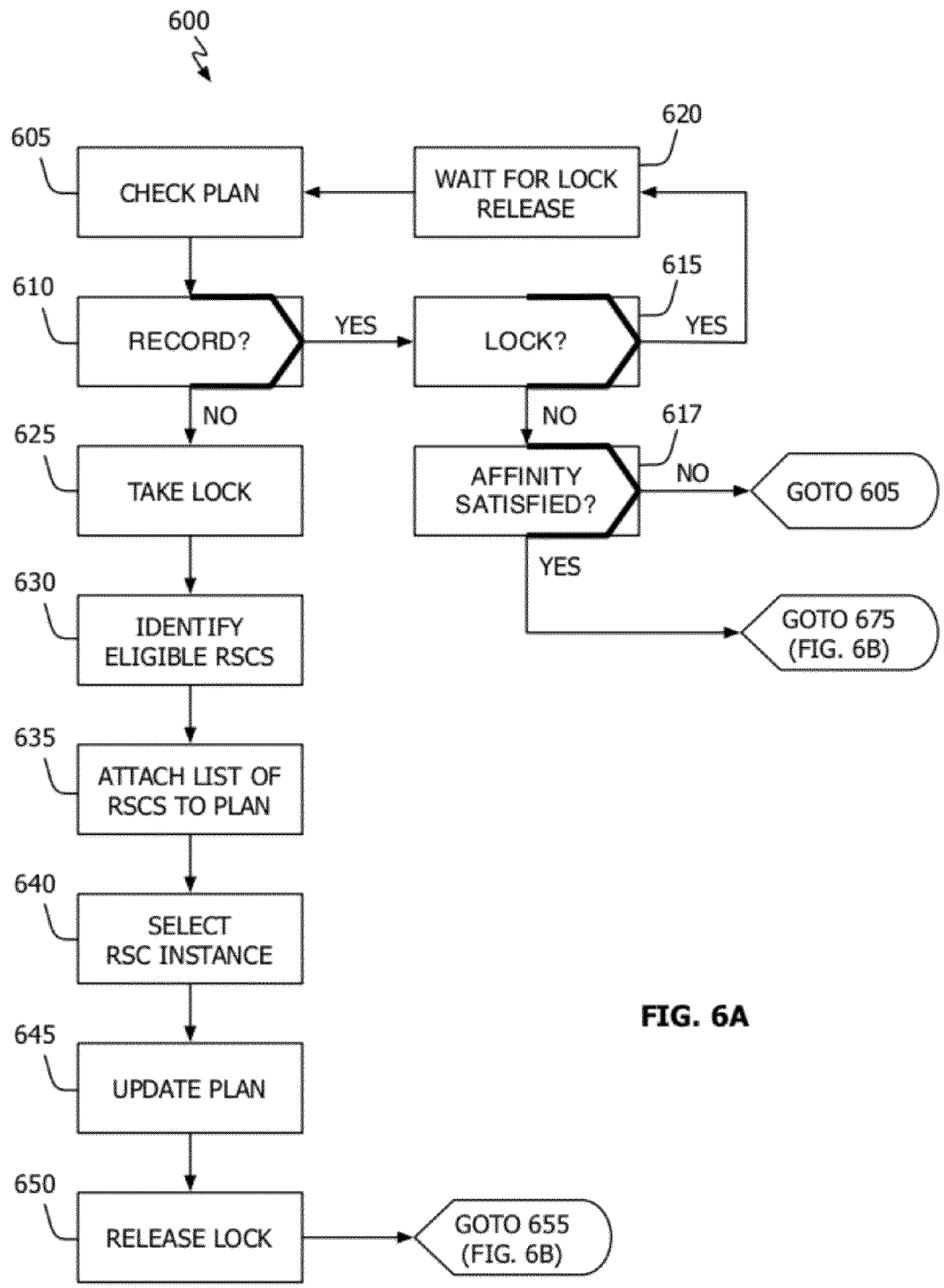

Referring to FIG. 6A, illustrative resource identification operation 600 as it relates to the current example is shown. To begin, a check may be made to the current plan to determine if it has a record for a resource of type X related to P (block 605). If such a record exists (the "YES" prong of block 610), a further check may be made to determine if a lock exists on the resource (block 615). If the resource is locked (the "YES" prong of block 615), operation 600 waits for the lock to release (block 620) whereafter it returns to block 605. If the current plan has a record for resource X but there is no lock (the "NO" prong of block 615), a further check may be made to determine if the identified resource satisfies any specified affinity requirements (block 617). If the affinity requirements are satisfied, or if there are no affinity requirements (the "YES" prong of block 617), operation 600 continues at block 675 in FIG. 6B (see discussion below). If there are affinity requirements that are not met by the identified resource (the "NO" prong of block 617), processing returns to block 605 to identify another potential resource. If the current plan does not have a record for resource of type X (the "NO" prong of block 610), a lock may be acquired related to the type X information in the plan (block 625). Next, all of the eligible resources of type X available to the current layer within the domain of P may be be identified (block 630) and the list of one or more available resources attached to the plan (block 635). At this point, it may be useful to recall that identification of eligible resources may make use of policies or rules. Following acts in accordance with block 635, a specific one of the available resource instances may be selected, call this instance S (block 640). In one embodiment, the selection of a specific instance may be performed by an advisor module (e.g., Advisor module 405) in collaboration, for example, with a layer control module (e.g., Layer Control module 400) and/or a policy engine (e.g., Policy Engine 410). Once selected, the plan may be updated with information about instance S (block 645), whereafter the lock taken in accordance with block 625 may be released (block 650).

Referring to FIG. 6B, after releasing the lock in accordance with block 650 a check may be made to determine if resources from a lower layer are required (block 655). In the current example, it was noted that the target application required three (3) instances of type 'Y' resource and that these should be drawn from type 'X' resources. In such a case, lower layer resources are required (the "YES" prong of block 655) and, as such, three calls to the next lower layer may be issued for instances of type Y (block 665). Operation 600 would then (logically) continue at block 605—only this time it would be a different layer performing the actions. That is, operation 600 (like operation 100) may "recurse." Returning now to block 655, if no additional lower layer resources are required (the "NO" prong of block 655), the layer waits for a return from its lower layer (block 670). On return, a check may be made to determine if the current layer is the top most layer (block 675). If the current layer is the top most layer (the "YES" prong of block 675), Operation 600 completes successfully. If the current layer is not the top most layer (the "NO" prong of block 675), a return to the next upper layer may be made (block 680). The effect of returning to a higher layer is a return to block 605 which, in turn, leads to block 675.

At the end of operation 600 the plan may contain details about what resources have been selected at each layer. It is noted that during operation 600, the system may also place soft-locks on the selected resources as well as take established soft-allocations into account. As used herein, the term "system" refers to the collection of operating modules at each layer. For example, if there are 3 layers and each layer includes a layer control module (e.g., module 400), an advisor module (e.g., module 405) and a policy engine (e.g., Policy Engine 410), the "system" would refer the aggregate collection of modules.

Algorithm Example

Dealing With Failure

Figure 7:
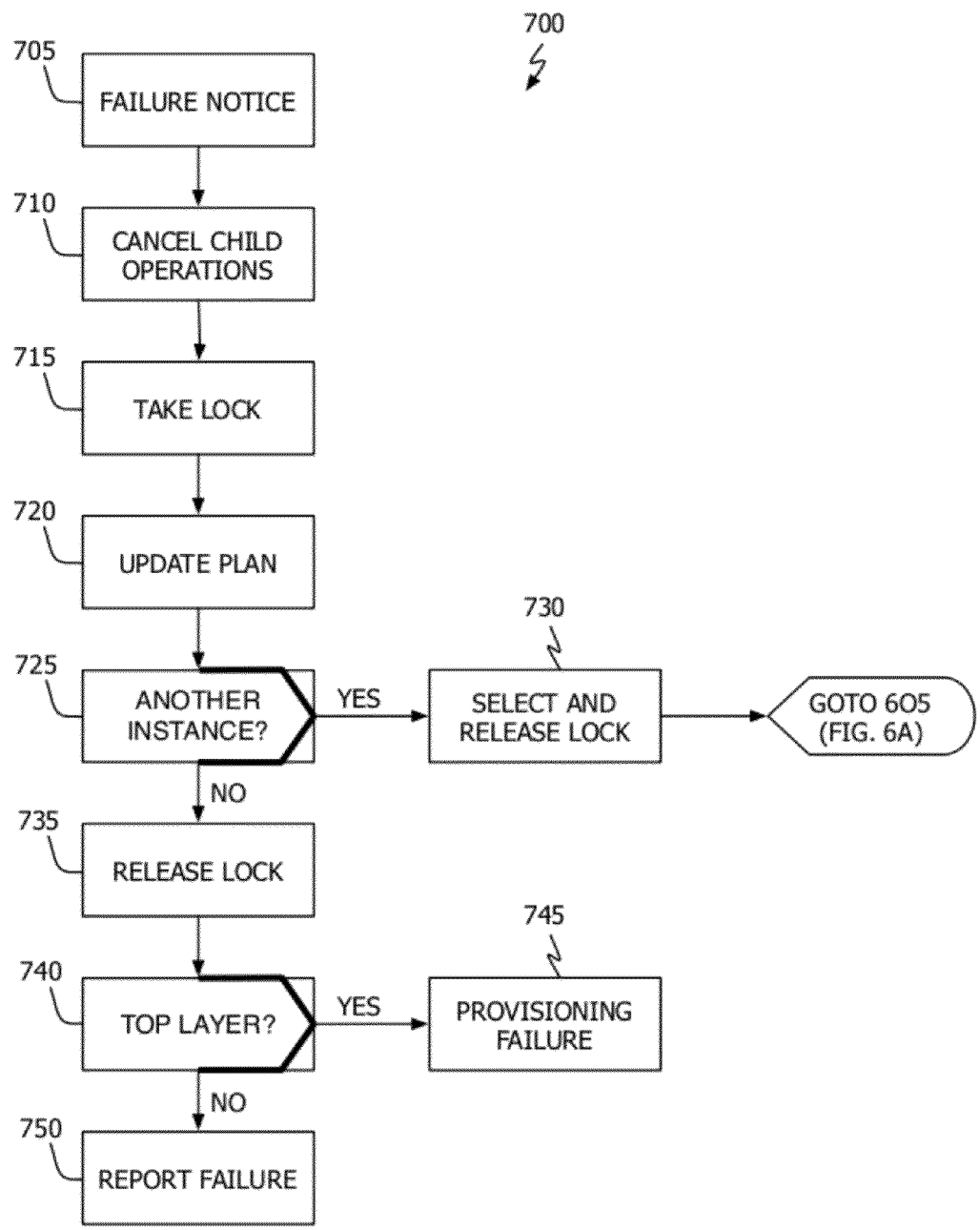
FIG. 7 shows, in flowchart form, a resource failure response operation in accordance with one embodiment.

Referring now to FIG. 7, if an advisor module had indicated that S was not a viable option (perhaps because of capacity), failure response operation 700 could be invoked. When the call to operation 600 indicates that S is not a viable option, the layer above where P was selected receives an event indicating the failure (block 705). That layer's control module (or functional equivalent) may then cancel the child processes that are executing based on the decision to select instance P (block 710). After all processes have been terminated, the control module may take a lock on the plan (block 715) and update the plan to indicate the instance P was attempted and failed (block 720). If another instance is available (the "YES" prong of block 725), it may be selected and the lock taken in accordance with block 715 released (block 730) whereafter operation 600 may once again be initiated. If another instance is not available (the "NO" prong of block 725), the lock taken in accordance with block 715 may be release (block 735) after which a check may be made to determine if the current layer is the "top layer." If such is the case (the "YES" prong of block 740), the resource identification process fails—meaning that the system cannot satisfy the users request (block 745). If the current layer is not the top most layer (the "NO" prong of block 740), the failure may be reported to the next higher layer (block 750).

Various changes in the components as well as in the details of the illustrated operational methods are possible without departing from the scope of the following claims. For instance, the disclosed methodologies are not restricted to cloud-based computing systems, but rather, may be useful in any computer system that may be modeled as a layered system.

It will be recognized that the disclosed methodologies (and their functional equivalents) may be embodied as one or more software program modules that can be executed by one or more programmable control devices. A programmable control device (e.g., provisioning server 205, one or more devices in compute resource pool 220 or a programmable resource in pool 225) may include any programmable controller device including, for example, one or more members of the Intel Atom®, Core®, Pentium® and Celeron® processor families from Intel Corporation. (INTEL, INTEL ATOM, CORE, PENTIUM, and CELERON are registered trademarks of the Intel Corporation.) Custom designed state machines may be used to implement some or all of the operations disclosed herein. Such devices may be embodied in a hardware device such as an application specific integrated circuits (ASICs) and field programmable gate array (FPGAs). Storage devices suitable for tangibly embodying program instructions (e.g., storage pool 215 objects as well as long-term storage and random access memory included in a programmable device such as provisioning server 205) include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Finally, it is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
receiving a plan to support a cloud-based service in a cloud-based computing system, the system having resources organized in a plurality of architectural layers, each layer including a different resource type or types than the other layers, the plan generated as resources eligible to support the service are identified, a respective portion of the plan corresponding to each of the plurality of architectural layers identifying layer-specific resource needed to support the cloud-based service, the plan recording details of which resources are needed or have been allocated to support the service;

for a current layer, carrying out a resource identification operation to determine an availability of one or more layer-specific resources that are needed to support the cloud-based service according to the respective portion of the plan for the current layer; and based on a determination that a needed resource is not available, returning a failure message for the current layer;

based on a determination that the one or more needed resources are available, selecting one resource instance and accordingly updating the plan to reflect the selection for the current layer;

determining whether the selected resource instance in the current layer needs to be supported by one or more resource from a lower layer in the plurality of architectural layers than the current layer according to updated plan;

based on a determination that the selected resource instance does not need to be supported by the one or more resources from the lower layer, reporting success for the current layer; based on a determination that the selected resource instance does need to be supported by the one or more resources from the lower layer, issuing a resource request to the lower layer for the one or more resources from the lower layer to support he selected resource instance, wherein the resources organized in the plurality of architectural layers include a first layer of one or more pods, a second layer of one or more network containers and a third layer of one or more virtual clusters.

2. The method of claim 1, wherein receiving a plan further comprises receiving a plan indicating a plurality of software resources.

3. The method of claim 2, wherein receiving a plan further comprises receiving a plan indicating at least one resource that is a combination of a hardware resource and a software resource.

4. The method of claim 1, wherein carrying out a resource identification operation to determine an availability of one or more layer-specific resources that are needed to support the cloud-based service according to the respective portion of the plan for the current layer includes:

checking the plan to determine if it has a record for a resource of a particular type for the current layer;

taking a lock on the plan if there is no record for the resource of the particular type for the current layer;

identifying one or more eligible resources of the particular type of resource; and indicating the identified one or more eligible resources in the plan.

5. The method of claim 4, wherein carrying out a resource identification operation to determine an availability of one or more layer-specific resources that are needed to support the cloud-based service according to the respective portion of the plan for the current layer includes:

identifying one or more eligible resources of a particular type of resource in accordance with one or more policies.

6. The method of claim 4, wherein updating the plan comprises:

indicating, in the plan, the selected resource instance; and removing the lock from the plan.

7. The method of claim 1, wherein selecting a resource instance comprises selecting a resource instance in accordance with one or more policies.

8. A program storage device, readable by a programmable control device, comprising instructions tangibly stored thereon for causing the programmable control device to perform the method of claim 1.

9. A cloud-based resource allocation system, comprising:

a memory having stored therein at least part of a plan, the plan indicating a plurality of resources of a cloud based computing system required to provision a cloud-based service, the resources organized in a plurality of architectural layers, each layer having different resource types than the other layers, the plan generated as resources eligible to support the service are identified, with a respective portion of the plan corresponding to each of the plurality of architectural layers identifying layer-specific resources needed to support the cloud-based service;

a programmable control device having access to program instructions, the program instructions when executed causing the programmable control device to:

for a current layer, determine an availability of one or more resources that are needed to support the cloud-based service according to the respective portion of the plan for the current layer;

based on a determination that a needed resource is not available, return a resource identification failure message for the current layer;

based on a determination that the one or more needed resources are available: select one resource instance and accordingly update the plan to reflect the selection for the current layer;

determine whether the selected resource instance in the current layer needs to be supported by one or more resources from a lower layer in the plurality of architectural layers than the current layer according to updated plan;

based on a determination that the selected resource instance does not need to be supported by the one or more resources from the lower layer, report success for the current layer;

based on a determination that the selected resource instance does need to be supported by the one or more resources from the lower layer, issue a resource request to the lower layer for the one or more resources from the lower layer to support the selected resource instance, wherein the resources in the plurality of architectural layers, include a first layer of one or more pods, a second layer of one or more network containers and a third layer of one or more virtual clusters. of a particular type.

10. The cloud-based resource allocation system of claim 9, wherein the program instructions when executed further cause the programmable control device to:

take a lock, for the lower layer, on a portion of the plan for the lower layer; and read, for the lower layer, at least a part of the portion of the plan for the lower layer.

11. The cloud-based resource allocation system of claim 10, wherein the program instructions when executed further cause the programmable control device to:

select, for the lower layer, an instance of a resource of a particular type from the one or more eligible resources identified in a portion of the plan for the next lower layer;

update a portion of the plan for the lower layer to indicate selection of the resource instance of the particular type; and release the lock, for the lower layer, on the portion of the plan for the lower layer.

12. The cloud-based resource allocation system of claim 9, further comprising program instructions which when executed further cause the programmable control device to:

when the plan indicates, in a portion of the plan for the lower layer, two or more eligible resources of a particular type, receive for the lower layer, a failure message from the lower layer, the failure message indicating that a selected resource instance could not be supplied by the lower layer;

update the portion of the plan for the lower layer to indicate that the selected resource instance is not available;
select the lower layer, a second resource instance from the two or more eligible resources identified in the portion of the plan for the lower layer.

13. The cloud-based resource allocation system of claim 9, further comprising
a layer control module in each of the architectural layers coupled to an advisor module, the advisor module configured to guide selection of one resource instance from one or more available resource instances in the respective architectural layer.

\* \* \* \* \*

UNITED STATES PATENT AND TRADEMARK OFFICE
CERTIFICATE OF CORRECTION

PATENT NO.         : 8,843,633 B2  
APPLICATION NO.    : 13/070412  
DATED              : September 23, 2014  
INVENTOR(S)        : Johan Eriksson et al.

Page 1 of 1

It is certified that error appears in the above-identified patent and that said Letters Patent is hereby corrected as shown below:

In the Claims

In column 8, line 57, in claim 1, delete "resource" and insert -- resources --, therefor.

In column 9, line 7, in claim 1, delete "resource" and insert -- resources --, therefor.

In column 9, line 17, in claim 1, delete "he" and insert -- the --, therefor.

In column 10, line 39, in claim 9, delete "clusters. Of a particular type." and insert -- clusters. --, therefor.

In column 11, line 3, in claim 12, delete "select the" and insert -- select for the --, therefor.

Signed and Sealed this  
Eighth Day of September, 2015

Michelle K. Lee  
*Director of the United States Patent and Trademark Office*